(12) United States Patent
Thompson

(10) Patent No.: US 8,028,019 B2
(45) Date of Patent: Sep. 27, 2011

(54) METHODS AND APPARATUS FOR DATA TRANSFER IN NETWORKS USING DISTRIBUTED FILE LOCATION INDICES

(75) Inventor: Mark Thompson, Tempe, AZ (US)

(73) Assignee: Solid State Networks, Inc., Tempe, AZ (US)

( * ) Notice: Subject to any disclaimer, the term of this patent is extended or adjusted under 35 U.S.C. 154(b) by 510 days.

(21) Appl. No.: 12/039,654

(22) Filed: Feb. 28, 2008

(65) Prior Publication Data

US 2008/0208996 A1  Aug. 28, 2008

Related U.S. Application Data

(60) Provisional application No. 60/892,052, filed on Feb. 28, 2007.

(51) Int. Cl.
*G06F 15/16* (2006.01)
(52) U.S. Cl. .......................................... 709/203; 709/245
(58) Field of Classification Search .................. 709/203
See application file for complete search history.

(56) References Cited

U.S. PATENT DOCUMENTS

| | | | | |
|---|---|---|---|---|
| 6,415,280 | B1 * | 7/2002 | Farber et al. ................. | 707/698 |
| 7,304,994 | B2 * | 12/2007 | Dubnicki et al. .............. | 370/392 |
| 7,643,458 | B1 * | 1/2010 | Talwar et al. ................ | 370/338 |
| 2004/0054807 | A1 * | 3/2004 | Harvey et al. ................ | 709/243 |
| 2005/0188085 | A1 * | 8/2005 | Lin et al. ..................... | 709/225 |
| 2005/0240591 | A1 * | 10/2005 | Marceau et al. ................ | 707/9 |
| 2007/0230482 | A1 * | 10/2007 | Shim et al. ................... | 370/400 |
| 2007/0233832 | A1 * | 10/2007 | Narayanan et al. ........... | 709/223 |
| 2007/0297417 | A1 * | 12/2007 | Cohen et al. .............. | 370/395.42 |
| 2008/0005086 | A1 * | 1/2008 | Moore ............................. | 707/3 |
| 2008/0040420 | A1 * | 2/2008 | Twiss et al. .................... | 709/203 |
| 2008/0040445 | A1 * | 2/2008 | Sullivan et al. ................ | 709/217 |
| 2008/0080392 | A1 * | 4/2008 | Walsh et al. .................... | 370/254 |
| 2008/0089299 | A1 * | 4/2008 | Lindsley et al. ............... | 370/338 |
| 2008/0133538 | A1 * | 6/2008 | Chavez et al. .................. | 707/10 |
| 2008/0133650 | A1 * | 6/2008 | Saarimaki et al. ............ | 709/203 |
| 2009/0083414 | A1 * | 3/2009 | Lazovsky et al. ............. | 709/224 |
| 2009/0106393 | A1 * | 4/2009 | Parr et al. ....................... | 709/218 |
| 2009/0150935 | A1 * | 6/2009 | Peters et al. ..................... | 725/46 |
| 2010/0131564 | A1 * | 5/2010 | Pettovello ..................... | 707/794 |

OTHER PUBLICATIONS

Neglia, Giovanni et al., "Availability in BitTorrent Systems," 2007, IEEE, pp. 2216-2224.*
Bram Cohen, "Incentives build robustness in BitTorrent," bram@bitconjurer.org, May 22, 2003, pp. 1-5.
Brandon Wiley, "Distributed hash tables, part 1," Linux Journal, Oct. 1, 2003, pp. 1-7.
Ming Xie, "P2P systems based on distributed hash table," Computer Science, University of Ottawa, Sep. 26, 2003, pp. 1-6.

* cited by examiner

*Primary Examiner* — Douglas Blair
*Assistant Examiner* — Benjamin Ailes
(74) *Attorney, Agent, or Firm* — The Noblitt GroupPLLC

(57) ABSTRACT

Methods and apparatus for data transfer according to various aspects of the present invention operate in conjunction with a peer-to-peer (p2p) network associated with distributed file location index. For example, a system according to various aspects of the present invention may identify a high-demand file item according to communications on the p2p network and store a copy of the high-demand file item. The system may assign a non-random node identifier to the system for identifying the computer system in the p2p network. The system may then respond to requests for the high-demand file item.

11 Claims, 4 Drawing Sheets

METHODS AND APPARATUS FOR DATA TRANSFER IN NETWORKS USING DISTRIBUTED FILE LOCATION INDICES

CROSS-REFERENCES TO RELATED APPLICATIONS

This application claims the benefit of U.S. Provisional Patent Application No. 60/892,052, filed Feb. 28, 2007, and incorporates the disclosure of such provisional application by reference.

BACKGROUND OF INVENTION

As more content becomes available on the Internet, peer-to-peer (p2p) networks have been developed to facilitate content distribution. P2p networks use the bandwidth and computing power of all the clients of the p2p network to distribute files, instead of relying upon a single web server. P2p networks work by splitting a large file into multiple file segments. The file segments are then distributed among the different clients of the p2p network. When a new client joins the p2p network, that client may begin retrieving file segments from the other p2p clients instead of from a single web server. As a result, large files can be transferred more easily between clients of the p2p network.

Although p2p networks facilitate the transfer of large files, the systems are not perfect. Because the clients communicate over different networks having varying performance and reliability, it may take longer for a p2p client to download a particular file segment from another p2p client. Furthermore, because clients are constantly joining and leaving the p2p network, particular file segments may become very scarce or even totally unavailable. These problems can severely impact the user's experience.

Many existing p2p networks employ a tracker computer or server that maintains a record of the p2p clients that are downloading a particular file from the p2p network. By maintaining this record, the tracker can facilitate communication between the p2p clients. In various network configurations. the tracker for a particular tile may be relatively easy to identify. However. some p2p network systems use a distributed tile location index, such as a distributed hash table (DHT). as a method of retrieving a file from the p2p network. Such methods. however, are often less effective at retrieving tiles. These systems may also hinder third-party monitoring and. caching of p2p network content.

SUMMARY OF THE INVENTION

Methods and apparatus for data transfer according to various aspects of the present invention operate in conjunction with a peer-to-peer (p2p) network associated with distributed file location index. For example, a system according to various aspects of the present invention may identify a high-demand file item according to communications on the p2p network and store a copy of the high-demand file item. The system may assign a non-random node identifier to the system for identifying the computer system in the p2p network. The system may then respond to requests for the high-demand file item.

BRIEF DESCRIPTION OF THE DRAWING FIGURES

Elements and steps in the figures are illustrated for simplicity and clarity and have not necessarily been rendered according to any particular sequence. For example, steps that may be performed concurrently or in a different order are illustrated in the figures to help to improve understanding of embodiments of the present invention.

Representative elements, operational features, applications and/or advantages of the present invention reside in the details of construction and operation as more fully described or otherwise identified. The description may refer to the accompanying drawings, images, figures, etc., wherein like numerals (if any) refer to like parts throughout. Elements, operational features, applications and/or advantages are illustrated by certain exemplary embodiments recited in the disclosure herein.

Elements in the figures, drawings, images, etc. are illustrated for simplicity and clarity and have not necessarily been drawn to scale. For example, the dimensions of some of the elements in the figures may be exaggerated relative to other elements to help improve understanding of various embodiments of the present invention. Furthermore, the terms 'first', 'second', and the like, if any, are used for distinguishing between similar elements and not necessarily for describing a sequential or chronological order. Moreover, the terms 'front', 'back', 'top', 'bottom', 'over', 'under', and the like in the disclosure and/or in the provisional embodiments, if any, are generally employed for descriptive purposes and not necessarily for comprehensively describing exclusive relative position. Any of the preceding terms so used may be interchanged under appropriate circumstances such that various embodiments of the invention, for example, are capable of operation in other configurations and/or orientations than those explicitly illustrated or otherwise described.

DETAILED DESCRIPTION OF EXEMPLARY EMBODIMENTS

The present descriptions relate to exemplary embodiments of the invention and the inventor's conception of the best mode and are not intended to limit the scope, applicability or configuration of the invention in any way. The following description is intended to provide convenient illustrations for implementing various embodiments of the invention. Changes may be made in the function and/or arrangement of any of the elements described in the disclosed exemplary embodiments without departing from the spirit and scope of the invention.

Figure 1:
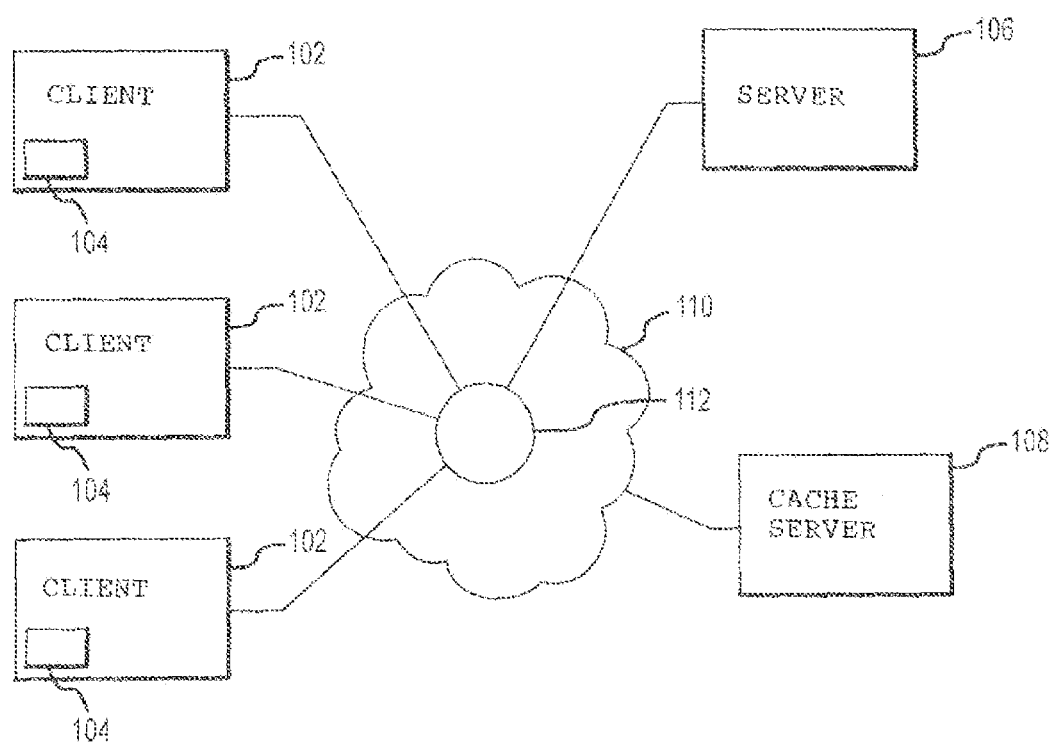
FIG. 1 is a block diagram of a network content caching system according to various aspects of the present invention.

Referring to FIG. 1. a system for transferring data via a network 112 according to various aspects of the present invention may comprise multiple computers exchanging data. For example, the present exemplary system for transferring data via a network 112 comprises multiple clients 102 connected to each other, one or more remote servers 106. and/or one or more caching servers 108 via a communications medium 110. Data is transferred among the various clients 102. servers 106. and/or caching servers 108 via the communications medium 110. A server may comprise a daemon or software application that may provide output to a client 102, for example a client comprising a computer system and/or software application. The server may alternatively or additionally comprise a physical computer connected to a network, for example implemented in conjunction with one or more physical computers.

In one embodiment, the system may include a peer-to-peer (p2p) network 112 for transferring data, although various aspects of the present invention may he used with other types of networks. For example, various aspects of the present invention may he applied to any system using a distributed file location index. The present exemplary embodiment includes a BitTorrent p2p network operating in conjunction with a distributed file location index. The distributed file location index contains possible locations of various files, and the index may be distributed across several data sources, memories, computers. or other network resources. For example, the distributed file location index may comprise a distributed hash table (DHT). such as according to Kademlia or other DHT-based peer-to-peer systems. The client application 104 may comprise a BitTorrent client application that connects to a DHT-based BitTorrent p2p network and retrieves file contents.

The clients 102 receive, store, and/or transmit information via the medium 110. The clients 102 may comprise any suitable system or software for communicating over a network or providing access to data that resides locally on a particular computer. For example, one or more clients 102 may comprise conventional computers having a processor and a memory, such as RAM, hard drives, CD-ROM drives and disks, or other appropriate volatile or non-volatile memory system. Alternatively, the client 102 may comprise a television, stereo, radio, telephone, personal digital system, or other device that receives or transmits digital or analog data.

In the present embodiment, the clients 102 may execute software applications for requesting and providing information via the medium 110. For example, each client 102 may comprise a conventional computer system that runs an operating system, such as Microsoft Windows, Mac OSX, or Linux, and may execute software and connect to a network. The client 102 may connect to the network in any suitable way, including a network cable connection or a wireless connection. Also, the client 102 may communicate through the network using any appropriate communication protocols, such as TCP/IP, UDP, etc. In the present embodiment, the client 102 may communicate using p2p networking processes.

The clients 102 may operate client applications 104 to request and receive data via the medium 110. The client applications 104 may comprise any software application or combination of software applications for requesting and/or receiving data via the medium 110. In one embodiment using p2p data transfers, the client applications 104 connect to a server 106 to retrieve data that describes a file to be retrieved by the client application 104. In the present embodiment, the data to be retrieved from the server 106 may comprise a torrent file that contains sufficient data to allow the client application 104 to retrieve the file.

The client application 104 may further use the data to connect to a p2p network 112, such as a BitTorrent p2p network, to retrieve segments of the file to be downloaded. While downloading a particular file from the p2p network 112, the client application 104 may identify those file segments that have not yet been retrieved and may connect to other clients 102 to retrieve those file segments. The client application 104 may initially retrieve a file or webpage from the server 106 or some other data source that contains information describing a file to be downloaded and allows the file to be retrieved via the network 112. The client application 104 may further store file items, such as complete files and file segments, and respond to requests for file items.

Furthermore, the client application 104 may be configured to operate in conjunction with the p2p network 112. In the present embodiment including the DHT-based p2p network, the client application 104 may generate a node identifier, such as a conventional nodeID, to identify the client 102 in the network. The client application 104 may also generate or retrieve file information, such as a file infoHash, that is based upon one or more attributes of the file to be transferred via the p2p network 112. The client application 104 may be otherwise configured in any appropriate manner to facilitate the data transfers via the communications medium 110 and/or the p2p network 112.

The communications medium 110 may comprise any suitable medium for transferring information. For example, the communications medium 110 may comprise the Internet or other suitable network, such as a local area network. In the present embodiment, the medium 110 includes the p2p network 112. The p2p network may comprise multiple devices configured to exchange information, such as independent computers that use the BitTorrent protocol to distribute digital files. The p2p network 112 may, however, comprise a network of computers using alternative systems for communicating and distributing files, such as Microsoft's Avalanche system or other appropriate file distribution system. The p2p network 112 communicates with the p2p clients 102 such that the p2p client 102 may retrieve file segments from the p2p network 112. Any appropriate system and device may be connected to the p2p network 112, such as computers, servers, entertainment systems, data sources, and other servers.

The p2p network 112 may further comprise at least one tracker that may monitor the p2p clients 102 that are connected to a particular p2p network 112. In the present embodiment, the tracker may comprise a conventional tracker operating on a computer to track which p2p clients 102 and other network 112 resources are storing and making available various file items, such as files and/or file segments. For example, the tracker may comprise one or more conventional computers or applications running on such computers that communicate with the p2p clients 102 through the medium 110. In various p2p network system implementations, the tracker for a particular file may be conventionally identified, for example in non-DHT BitTorrent systems in which the torrent file contains the address of the tracker. The tracker may be contacted by clients 102 to identify the network 112 resources that can be contacted by the clients 102 to get the desired files and file segments. In the present embodiment, however, the tracker is omitted, and file locations are instead determined using the DHT.

In the present embodiment using a distributed file location index, one or more of the p2p clients 102 and/or other network 112 elements may have file items available for transfer to other clients 102. The client application 104 may search for a particular file item based upon one or more characteristics of the file item sought. For example, in the present embodiment, the p2p network 112 may use the DHT or other distributed file location index to maintain and distribute p2p client 102 contact information for retrieving file segments. The DHT may comprise a decentralized system that allows files to be distributed among participating nodes and messages to be routed between those nodes to the holder of a particular file item. Such DHT systems tend to be scalable and fault tolerant and may facilitate communication and data retrieval between p2p clients 102.

In the present embodiment, all participating p2p clients 102 or other nodes of a DHT-based p2p network 112 are assigned one or more node identifiers, such as a conventional nodeID, to identify the node to the p2p network 112. The node identifiers may be assigned to distribute data transfer resources for efficient data transfer. For example, the node identifiers may be automatically generated, random, and/or part of a pre-determined keyspace. In the present embodiment, the nodeID is a member of a finite keyspace, such as a keyspace comprising a set of 160-bit strings. Because the nodeID may be random, as more p2p clients 102 join a p2p network 112 and are assigned nodeIDs, the nodeIDs tend to be fairly evenly distributed throughout the keyspace.

The node identifiers for each client 102 may be generated in many different ways, for example by a random number generator, a SHA hash of one or more of the p2p client 102 characteristics such as an IP address or a CPU ID, or any other method for generating an approximately random nodeID that resides within a pre-determined keyspace. Alternatively, the node identifiers may not be randomly assigned, and a substantially even distribution of p2p client 102 nodeIDs about the keyspace may be otherwise effected. Furthermore, a DHT p2p network 112 may be implemented in which the distribution of node identifiers about the keyspace is uneven.

In addition, each file item to be distributed by the DHT-based p2p network 112 may be assigned a unique file identifier, such as an infoHash. The file identifier may be a member of the same keyspace as the nodeIDs. In the present embodiment, the infoHash is a member of the set of 160-bit strings. The file identifier may have a random value that is based upon one or more of the attributes of the file item to be distributed. For example, the file identifier may be a SHA hash of the file item's filename or file contents. Alternative combinations of the file attributes, such as file size and file type may be used during the generation of the file's identifier. By ensuring that the infoHash is approximately randomly generated, the infoHashes tend to be distributed evenly throughout the keyspace.

With the p2p clients' 102 nodeIDs and the files' infoHashes evenly distributed throughout the keyspace, the DHT-based p2p network 112 may identify the p2p clients 102 that are distributing a particular file item. In the present embodiment, any p2p client 102 that wishes to download a particular file item must first determine that file's infoHash, for example by generating the infoHash from available information or acquiring it from another network element or other source. The requesting client may then communicate with other p2p clients 102 to determine those clients that have a nodeID closer to the infoHash of the target file item. The requesting client 102 may then request the file from a second client having a nodeID closer to the infoHash than the requesting client 102.

If the second client 102 does not have the requested file item, the second client 102 may forward the request or provide information regarding to one or more other p2p clients 102 that are currently distributing that file. In a DHT-based, system, the second client tends to recommend a third client 102 having a nodeID closest to the infoHash. If the third client 102 does not have the file, the third client may identify yet another client that may have the requested file. The clients 102 continue recommending other clients 102O until the target file item is found. In a DHT-based system, the clients 102 tend to recommend those clients having nodeIDs close to the infoHash of the requested file. The p2p clients 102 may employ, however, different algorithms to determine which p2p client 102 has a particular file item.

Figure 3:
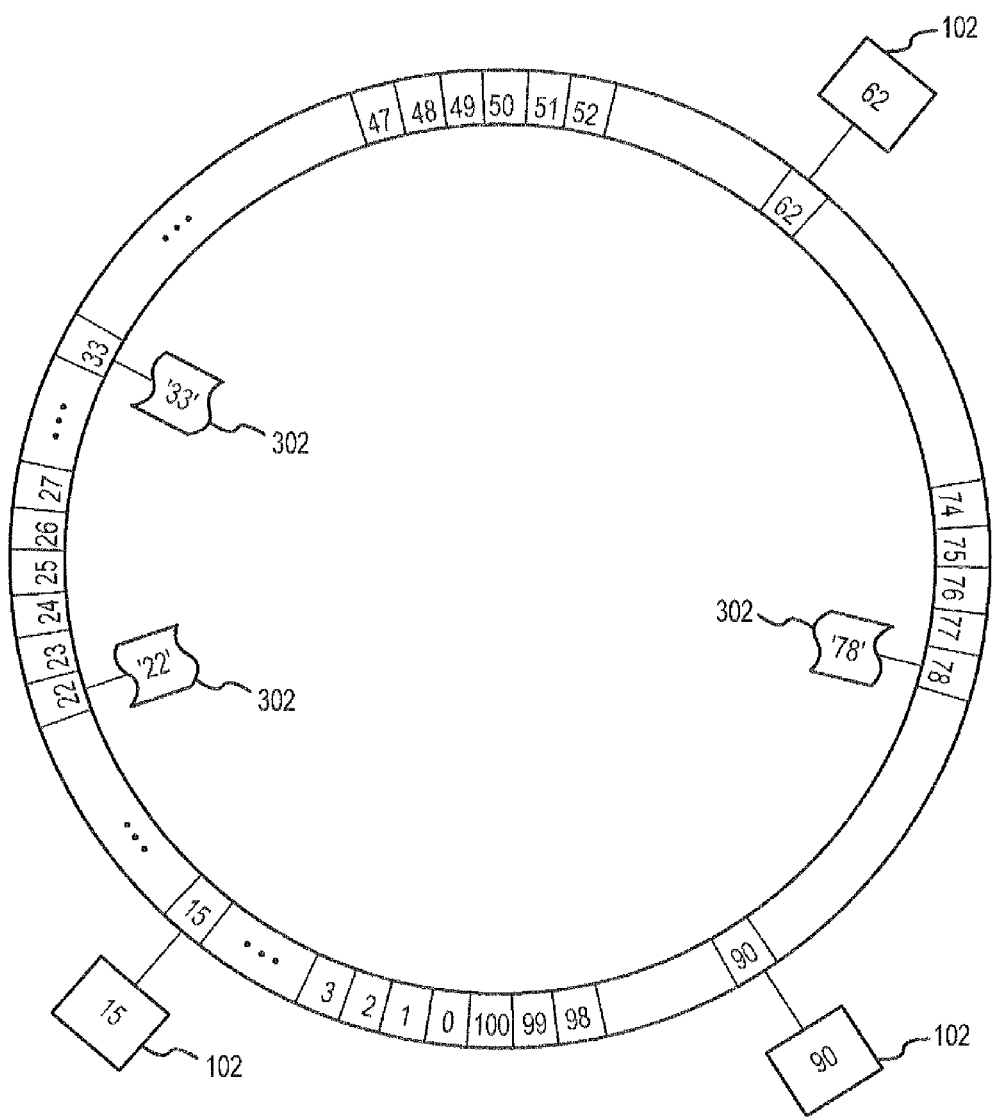
FIG. 3 is a diagram of a DHT-based p2p network.

For example, with reference to FIG. 3, a DHT-based p2p network 112 having a key space of the decimal numbers from 0 to 100 is shown. The p2p client 102 having a nodeID of 15 is responsible for tracking files 302 having infoHashes of 22 and 33. The p2p client 102 having a nodeID of 62 is responsible for tracking the file 302 having an infoHash of 78. The p2p client 102 having a nodeID of 90 is not responsible for tracking any of the files 302.

Alternate methods of assigning this responsibility may be used. For example, the p2p client 102 may be responsible for those infoHashes that fall closer to its nodeID than any other nodeID. Any method of assigning responsibility for infoHashes to p2p clients 102 may be used, although the responsibilities may be evenly distributed among the p2p clients 102 of the p2p network 112. In an alternative system, tracker responsibilities may not be evenly distributed amongst p2p clients 102. For example, a p2p client 102 having high bandwidth may be assigned more tracker responsibilities than other p2p clients 102.

The present embodiment may also include one or more servers 106 that may operate as data sources and provide other appropriate functions. The server 106 may comprise any data source configured to communicate via the medium 110. For example, the server 106 may comprise hardware, software, and/or networking components to receive and process requests from the clients 102 and/or client applications 104, and/or provide a website or other Internet-based interface accessible by the p2p clients 102 and the client applications 104. In one embodiment, the server 106 comprises a computer running an operating system, such as Microsoft Windows, Mac OSX, Linux, etc., and a web server, such as Apache.

The server 106 may also store information that describes the file that is to be delivered to the client application 104. For example, the server 106 may store a torrent file that contains sufficient data to allow a p2p client 102 to retrieve the file from the p2p network 112. Alternatively, the server 106 may store the infoHash for the file, which may be downloaded by the client application 104 to begin a search for the file on the p2p network 112.

The present embodiment includes one or more caching servers 108, which may operate as data sources, function as clients 102, monitor data traffic on the p2p network 112, cache file items, and/or provide other appropriate functions. The caching server 108 may comprise any data source or other system configured to communicate via the medium 110. For example, the caching server 108 may comprise hardware, software, and/or networking components configured to operate as a client 102, for example to send, receive, and process requests from the clients 102. The caching server 108 may also provide a website or other Internet-based interface accessible by the clients 102 and the client application 104.

In one embodiment, the caching server 108 comprises a computer running an operating system (i.e. MS Windows, Mac OSX, Linux, etc.) and a web server (i.e. Apache, etc.). The computer may communicate using a p2p networking protocol. For example, the caching server 108 may comprise a computer that operates using the BitTorrent protocol to distribute files and file segments to other clients of the p2p network 112. In the present embodiment, the caching server 108 communicates with the DHT-based p2p network 112 via the medium 110.

The caching server 108 may comprise multiple computers connected to the medium 110 using different service providers. Alternatively, the caching server 108 may comprise a single computer that contains one or more network connection devices coupled to the medium 110 through one or more service providers.

In one embodiment, the caching server 108 comprises a data source configured to communicate via the medium 110, for example to provide data to requesting clients 102 and client applications 104. In one embodiment, the caching server 108 comprises a web server configured to serve requests from a client 102 and/or client application 104 communicating with the caching server 108. The client 102 or a client application 104 may, in its communication with the caching server 108, specify an entire file or a subsection of the file to be retrieved. The caching server 108 may then transmit the entire file or only the requested portion of the file to the client 102 or the client application 104. The caching server 108 may also store information that describes the file that is to be delivered to the client application 104, such as the info-Hash or other file identifier for a particular file. By providing a resource for obtaining file items to the clients 102, the caching server 108 may improve the effectiveness of the network 112.

The caching server 108 may store file items according to any appropriate criteria. For example, the caching server 108 may store all file items for which it receives a request for a time, such as until the information is not requested for a period of time or when the cache server memory exceeds a threshold. In one embodiment, the caching server 108 stores file items that are being requested most frequently by the clients 102. For example, the caching server 108 may identify the most popular file requests, obtain and store the popular file item, and position itself as an available resource to provide the popular file items to the clients 102.

The caching server 108 may identify the most popular file items in any appropriate manner, such as by monitoring file requests on the p2p network 112. In the present embodiment, the caching server 108 generates multiple nodeIDs for itself to monitor the requests, responses, and other traffic relating to the file items transferred via the network 112. For example, the caching server 108 may generate and use multiple different nodeIDs, such as four, six, ten, or twenty nodeIDs, that are substantially evenly distributed around the keyspace. The caching server 108 may then use the nodeIDs to receive requests from other p2p clients 102 of the p2p network 112. By selecting multiple, nonrandom nodeIDs, the caching server 108 increases number of file item requests that it is likely to receive, which facilitates monitoring the p2p network 112, for example to identify those file items in the greatest demand. By evenly distributing its nodeIDs, the caching server 108 may maximize the p2p client 102 communications that it can observe, allowing the caching server 108 to more effectively monitor the network 112 traffic.

The caching server 108 may also selectively cache files, for example to optimize and/or monitor network 112 performance. For example, as the caching server 108 receives requests from other clients 102, the caching server 108 may identify those file items subject to the greatest demand. The caching server 108 may the request copies of the most popular file items, or any other appropriate file items, for storage and distribution by the caching server 108. The caching server 108 may, however, apply any appropriate criteria to determine which file items to cache.

The caching server 108 may further position itself in the p2p network 112 to receive and process file requests for the cached files. In one exemplary embodiment for a DHT-based system, the caching server 108 may set multiple nodeIDs (or a single nodeID) according to one or more file identifiers for selected files to establish the caching server 108 as a likely resource to receive requests for the selected files. For example, the caching server 108 may select a nodeID close to the infoHash of a cached file so that file item requests are likely to be sent to the caching server 108. By establishing a nodeID close to the infoHash of the selected file, the caching server 108 increases the likelihood that requests for the file in the DHT-based network 112 will be routed to the caching server 108.

Figure 4:
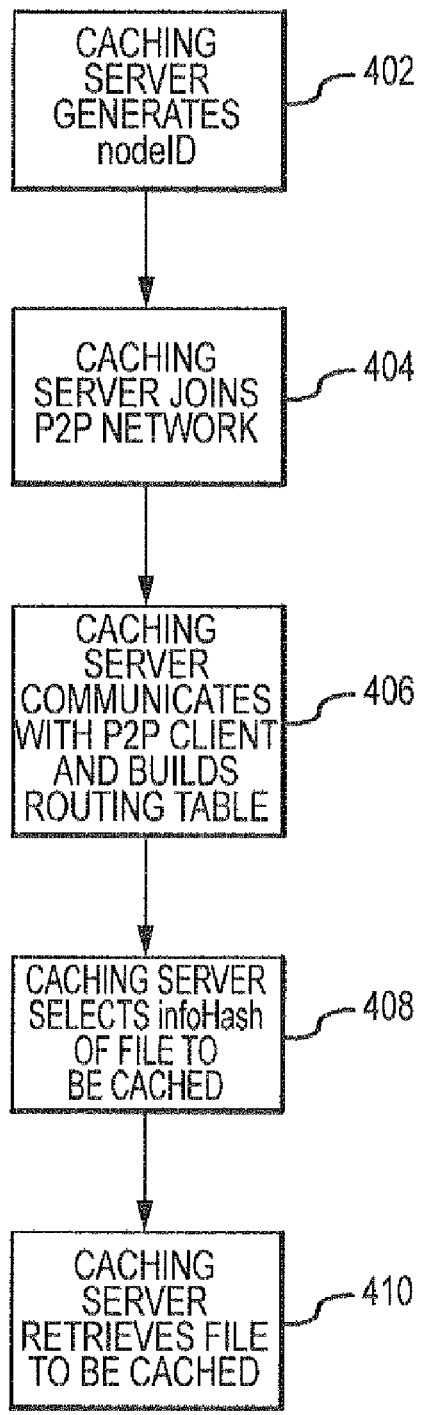
FIG. 4 is a flow diagram of a method of network content transfer according to various aspects of the present invention.

In operation, referring to FIG. 4, the data transfer system may communicate content that is distributed within a p2p network 112. such as a DFIT-based network. For example, to join the p2p network 112. the caching server 108 may generate at least one nodeID (402) for itself. The caching server 108 may use any algorithm for generating the nodeID. The nodeID may be randomly generated. or generated by via non-random criteria. For example, the nodeID may he selected to he arbitrarily close to a pre-determined infoHash. such as the infoHash of a selected file. The caching server 108 may also generate multiple nodeIDs. In one embodiment, the nodeIDs generated by the caching server 108 are selected to be evenly distributed about the keyspace of the DHT-based p2p network 112.

After generating a nodeID (402), the caching server 108 joins the p2p network 112 (404) and may act as a normal p2p client 102. For example, the caching server 108 may communicate with other p2p clients 102 and begin building a routing table (406) that describes the nodeID and contact information of other p2p clients 102 in the DHT-based p2p network 112.

As the caching server 108 continues to act as a p2p client 102 on the p2p network 112, the caching server 108 may receive requests from other p2p clients 102 for a file having a particular infoHash. In particular, the requests may request contact information for a p2p client 102 having the requested file item. The caching server 108 may choose to operate as a cache for the requested file (408). If so, the caching server 108 may request the file item to acquire a copy of the file item (410).

The caching server 108 may use any suitable criteria for determining whether to cache a version of a particular file. For example, if the caching server 108 determines that a high percentage of p2p clients 102 are requesting peer information for a particular infoHash (indicating that many p2p clients 102 are trying to download that particular file), then the caching server 108 may elect to cache that file. Alternatively, the caching server 108 may only wish to cache files that have infoHashes having particular values. The caching server 108 may further cache every file having a corresponding info-Hash.

In an alternate embodiment, the caching server 108, upon receiving communications relating to a particular infoHash, may elect to generate a nodeID sufficiently close to the infoHash to ensure that the caching server 108 is likely to receive requests for the file item. The caching server 108 may thus present itself as a network resource likely to have the requested file item.

After retrieving a copy of the file's file segments from the DHT-enabled p2p network 112, the caching server 108 may then re-distribute the file segments to other p2p clients 102 in any suitable manner. For example, the caching server 108 may continue to act as a normal p2p client 102 or other data source and continue distributing the file segments of the file to p2p clients 102 that request those file segments.

Figure 2:
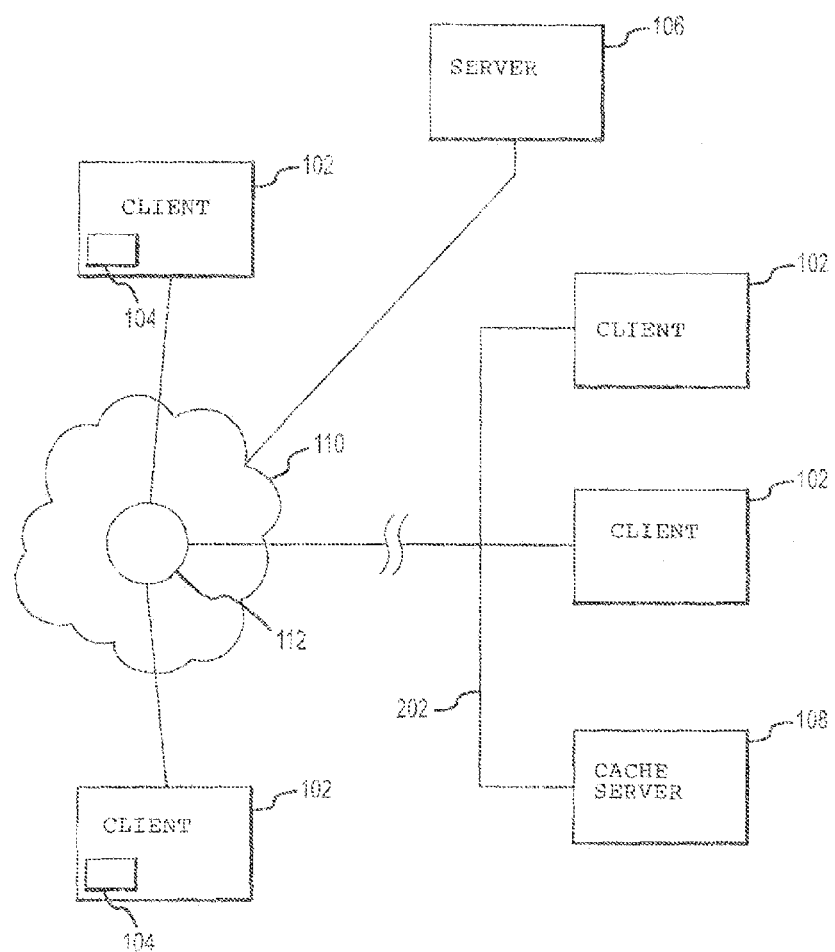
FIG. 2 is a block diagram of a network content caching system according to various aspects of the present invention.

With reference to FIG. 2, in an alternative embodiment, the caching server 108 may distribute content to other p2p clients 102 in different ways depending upon various characteristics of the p2p clients 102. For example, the caching server 108 may limit the bandwidth of connections or be totally unavailable to p2p clients 102 if they do not reside on the same network segment 202 as the caching server 108. Alternatively, p2p clients 102 that are not using a specific client application 104 may be unable to retrieve file segments from the caching server 108.

In the foregoing specification, the invention has been described with reference to specific exemplary embodiments. Various modifications and changes may be made without departing from the scope of the present invention as set forth in the exemplary provisional embodiments. The specification and figures are to be regarded in an illustrative manner, rather than a restrictive one and all such modifications may be included within the scope of the present invention. For example, the steps recited in any method or process embodiments may be executed in any appropriate order and are not limited to the specific order presented in the provisional embodiments. Additionally, the components and/or elements recited in any apparatus embodiment may be otherwise assembled or operationally configured to produce substantially the same result and are accordingly not limited to the specific configurations recited in the provisional embodiments.

Various benefits, advantages, and solutions to problems have been described with regard to particular embodiments. Any benefit, advantage, solution to problems or any element that may cause any particular benefit, advantage, or solution to occur or to become more pronounced are not to be construed as critical, required, or essential features or components of any or all the provisional embodiments.

The terms "comprises", "comprising", "including", or any variation thereof, are intended to reference a non-exclusive inclusion, such that a process, method, article, composition, or apparatus that comprises one or more elements does not include only the elements recited, but may also include other elements not expressly listed or inherent to such process, method, article, composition or apparatus. Other combinations and/or modifications of the described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the disclosed invention.

The invention claimed is:

1. A computer system for exchanging data with clients connected via a peer-to-peer (p2p) network for transferring file items and associated with node identifiers in conjunction with a distributed file location index, comprising:
   a memory configured to store the-file items; and
   a processor coupled to the memory and configured to:
      identify a high-demand file item according to communications on the p2p network;
      store a copy of the high-demand file item in the memory;
      respond to requests for the high-demand file item from the clients; and
      assign the computer system a non-random node identifier in the p2p network, wherein the non-random node identifier is assigned according to an identifier that uniquely identifies the high-demand file item.

2. A computer system according to claim 1, wherein the processor is further configured to assign multiple non-random node identifiers to the computer system substantially evenly around a keyspace associated with the distributed tile location index.

3. A computer system according to claim 1, wherein the processor is further configured to request and distribute the file items using a distributed hash table.

4. A computer-implemented method of transferring data files among clients connected via a peer-to-peer (p2p) network and associated with node identifiers in conjunction with a distributed file location index, comprising:
   identifying a high-demand file item according to communications on the p2p network;
   storing a copy of the high-demand file item in a memory of the computer, wherein the high-demand file item is associated with an identifier that uniquely identifies the high-demand file item;
   responding to requests for the high-demand file item from the clients; and
   assigning a non-random node identifier to the computer adapted to identify the computer in the p2p network, wherein assigning the non-random node identifier comprises selecting the non-random node identifier according to the identifier that uniquely identifies the high-demand file item.

5. A computer-implemented method of transferring data files according to claim 4, wherein assigning the non-random node identifier comprises assigning multiple non-random node identifiers to the computer system substantially evenly around a keyspace associated with the distributed file location index.

6. A computer-implemented method of transferring data files according to claim 4, wherein responding to requests comprises transferring the high-demand file item in response to requests received in conjunction with a distributed hash table.

7. A nontransitory computer-readable medium storing instructions for causing a computer system to implement a process for transferring data files among clients connected via a peer-to-peer (p2p) network and associated with node identifiers in conjunction with a distributed file location index, comprising:
   identifying a high-demand file item according to communications on the p2p network;
   storing a copy of the high-demand file item in a memory of the computer system, wherein the high-demand file item is associated with an identifier that uniquely identifies the high-demand file item;
   responding to requests for the high-demand file item from the clients; and
   assigning a non-random node. identifier to the computer system adapted to identify the computer system in the p2p network, wherein assigning the non-random node identifier comprises selecting the non-random node identifier according to the identifier that uniquely identifies the high-demand file item.

8. A nontransitory computer-readable medium storing instructions according to claim 7 wherein assigning the non-random node identifier comprises assigning multiple non-random node identifiers to the computer system substantially evenly around a keyspace associated with the distributed file location index.

9. A nontransitory computer-readable medium storing instructions according to claim 7, wherein responding to requests comprises transferring the high-demand file item in response to requests received in conjunction with a distributed hash table.

10. A computer-implemented process for exchanging data in a BitTorrent p2p network in conjunction with a distributed hash table (DHT), comprising:
   identifying a high-demand file item according to communications on the BitTorrent p2p network;
   storing a copy of the high-demand file item in a memory;
   responding to requests for the high-demand file item received via the BitTorrent p2p network; and
   assigning a non-random node identifier to the computer adapted to identify the computer in the BitTorrent p2p network, wherein assigning the non-random node identifier comprises selecting the non-random node identifier according to an identifier that uniquely identifies the high-demand file item.

11. A computer-implemented process for exchanging data according to claim 10, wherein assigning the non-random node identifier comprises assigning multiple non-random node identifiers to the computer system substantially evenly around a keyspace associated with the DHT.

* * * * *